(12) United States Patent
Nakajima

(10) Patent No.: US 7,253,807 B2
(45) Date of Patent: *Aug. 7, 2007

(54) INTERACTIVE APPARATUSES WITH TACTILEY ENHANCED VISUAL IMAGING CAPABILITY AND RELATED METHODS

(75) Inventor: Satoshi Nakajima, Redmond, WA (US)

(73) Assignee: UIEvolution, Inc., Bellevue, WA (US)

( * ) Notice: Subject to any disclaimer, the term of this patent is extended or adjusted under 35 U.S.C. 154(b) by 119 days.

This patent is subject to a terminal disclaimer.

(21) Appl. No.: 10/255,876

(22) Filed: Sep. 25, 2002

(65) Prior Publication Data

US 2004/0056877 A1    Mar. 25, 2004

(51) Int. Cl.
G09G 5/00    (2006.01)

(52) U.S. Cl. .................. 345/173; 345/174; 715/702

(58) Field of Classification Search ........ 345/173–174, 345/702; 200/521, 571; 340/825.19, 825; 715/702

See application file for complete search history.

(56) References Cited

U.S. PATENT DOCUMENTS

| | | | | |
|---|---|---|---|---|
| 4,871,992 A | * | 10/1989 | Petersen | .................. 340/407.1 |
| 4,914,624 A | * | 4/1990 | Dunthorn | ..................... 345/173 |
| 5,589,856 A | * | 12/1996 | Stein et al. | .................. 345/173 |
| 5,636,038 A | * | 6/1997 | Lynt et al. | ................... 358/471 |
| 5,717,423 A | * | 2/1998 | Parker | ......................... 345/108 |
| 5,907,375 A | * | 5/1999 | Nishikawa et al. | ........... 349/12 |
| 6,198,475 B1 | * | 3/2001 | Kunimatsu et al. | .......... 345/173 |
| 6,535,201 B1 | * | 3/2003 | Cooper et al. | .............. 345/173 |
| 6,636,202 B2 | * | 10/2003 | Ishmael et al. | ............. 345/173 |
| 2003/0179190 A1 | * | 9/2003 | Franzen | ....................... 345/173 |

* cited by examiner

*Primary Examiner*—Richard Hjerpe
*Assistant Examiner*—Leonid Shapiro
(74) *Attorney, Agent, or Firm*—Schwabe, Williamson & Wyatt, P.C.

(57) ABSTRACT

An interactive apparatus is provided with a display, on which tactilely enhanced (TE) visual images may be rendered, to temporally realize a wide range of user input keys and/or user selectable menu/list items. In one embodiment, the display includes a flexible visual display layer and a tactile display layer, and the apparatus includes corresponding device drivers for controlling rendering on the respective layers. In one embodiment, the apparatus is further provided with graphics functions, which generate in response to a request to render a TE visual image, pixel and piston data of the TE visual image, in accordance with an image specification of the TE visual image, having tactile attributes of the tactile enhancements.

39 Claims, 13 Drawing Sheets

INTERACTIVE APPARATUSES WITH TACTILEY ENHANCED VISUAL IMAGING CAPABILITY AND RELATED METHODS

FIELD OF THE INVENTION

The present invention relates to the field of interactive apparatus. More specifically, the present invention relates to an interactive apparatus with tactilely enhanced visual imaging capability.

BACKGROUND OF THE INVENTION

Human-machine interface has long been a subject of interest to designers of human operated machinery, particularly for machines or devices intended for "unskilled" novice users, such as personal devices of various kinds, remote controls, palm-sized computing devices (also referred to as personal digital assistants (PDA)), laptop computers, and so forth. Improved ease-of-use, in general, improves user satisfactions.

Increasingly, as a result of advances in microprocessor and other related technologies, more and more personal devices are processor based and multifunctional. For example, today one can acquire a PDA that can also serve as a wireless mobile phone, a MP3 player and so forth.

Typically, the appropriate end user interfaces, i.e. the interfaces for operating one of these devices as a PDA, a wireless mobile phone, or a MP3 player and so forth, are presented on a touch sensitive screen on an as needed basis. A user would interact with the interface by touching the appropriate interface element, a visual image, e.g. a key or button image, or a menu or list item image.

Many of these graphical interfaces are intuitive, and easy-to-use. However, as friendly as these graphical interfaces are, there is no tactile feel to the touching of the key or button image (i.e. a user does not feel the clicking of a real key/button). The same applies to the selection of menu or list items. The lack of tactile feedback is "difficult" or "less satisfying" for some user.

Thus, it is desirable if the user experience may be further enhanced by providing the user with tactile sensations when interacting with at least some of the interface elements.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF EMBODIMENTS OF THE INVENTION

The present invention includes an interactive apparatus with tactilely enhanced visual imaging capability.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Parts of the description will be presented in display technology terms, such as pixels, active matrix, pistons and so forth, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through electrical and/or optical components of a processor and its subsystems.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Section headings are merely employed to improve readability, and they are not to be construed to restrict or narrow the present invention.

Overview

Figure 1:
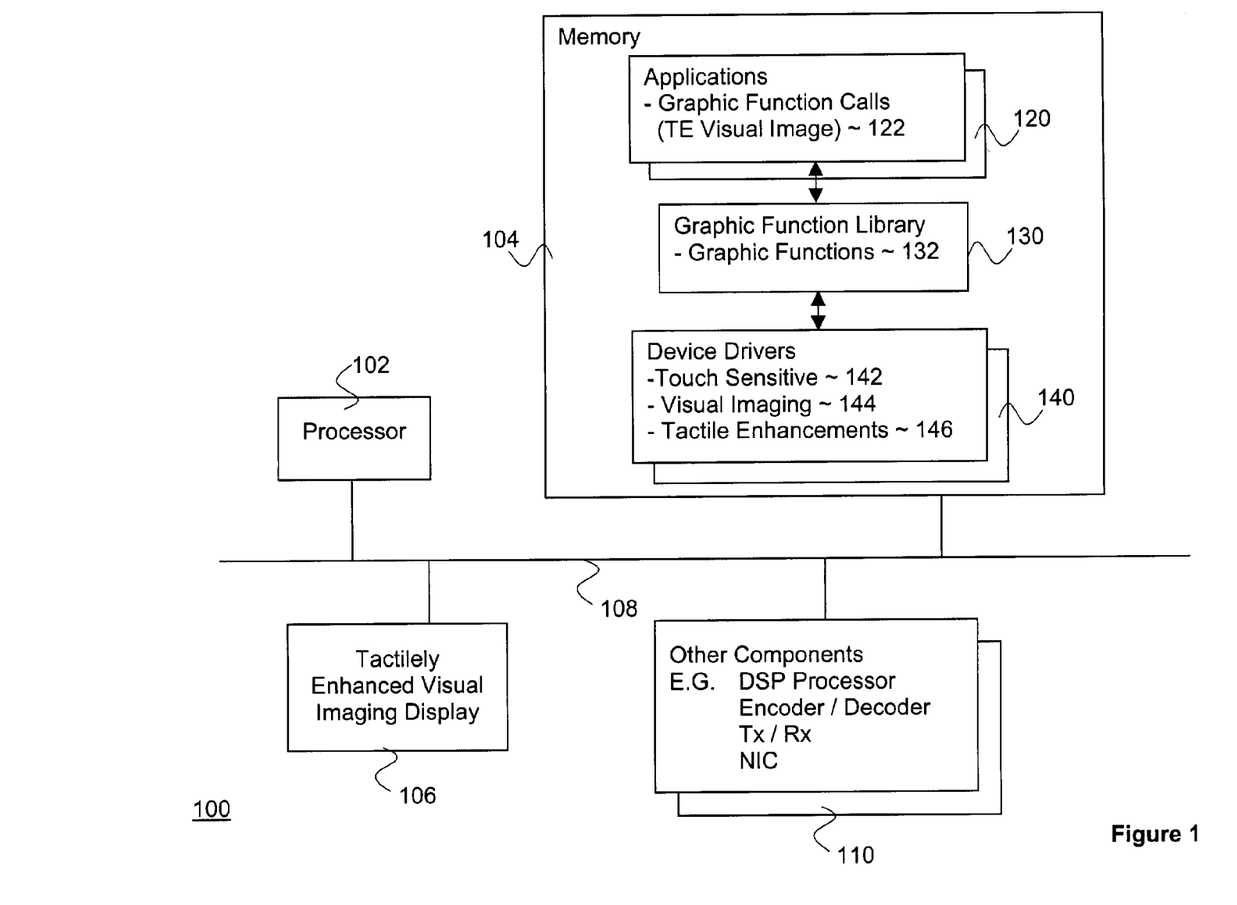
FIG. 1 illustrates an architectural view of an interactive apparatus of the present invention, in accordance with one embodiment.

FIG. 1 illustrates an architectural view of an interactive apparatus of the present invention, in accordance with one embodiment. As illustrated, interactive apparatus 100 comprises processor 102, memory 104 and tactilely enhanced visual imaging display 106, coupled to each other via bus 108. As will be described in more detail below, tactilely enhanced visual imaging display 106 advantageously enables various tactilely enhanced visual images to be rendered to emulate various input keys/buttons, and/or provide tactilely enhanced menu/list items. These tactilely enhanced emulated input keys/buttons, and/or tactilely enhanced menu/list items provide enhanced user experience, by providing tactile sensations to the user, when interacting with the rendered visual images of these key/buttons and menu/list items.

As illustrated, for the embodiment, apparatus 100 is equipped with device drivers 140 and graphics functions 130, incorporated with the teachings of the present invention, to enable applications 120 to exploit the capabilities of tactilely enhanced visual imaging display 106 to improve user experience.

Also, depending on the intended usage of interactive apparatus 100, it may further include additional components such as digital signal processor (DSP), encoder/decoder, transceiver (TX/RX), network interface (NIC), and so forth.

These and other aspects of interactive apparatus 100 will be described in more detail in turn.

Processor and Memory

Still referring to FIG. 1, processor 102 controls the operation of apparatus 100, by executing the binaries or instructions loaded into memory 104.

Processor 102 may be any one of a number of processors known in the art, including but are not limited to the Pentium® processors available from Intel Corporation of Santa Clara, Calif. or the Anthlon® processors available from Advanced Micro Devices of Sunnyvale, Calif.

Memory 104 may be volatile or non-volatile memory of any kind known in the art. Typically, when non-volatile memory is employed, apparatus 100 further includes mass storage devices, such as disk drive, CDROM, DVD drives, and so forth, where a persistent copy of the binaries/instructions may be stored, or a NIC, through which the binaries/instructions may be retrieved from a remote location.

Tactilely Enhanced Visual Imaging Display

Figure 2:
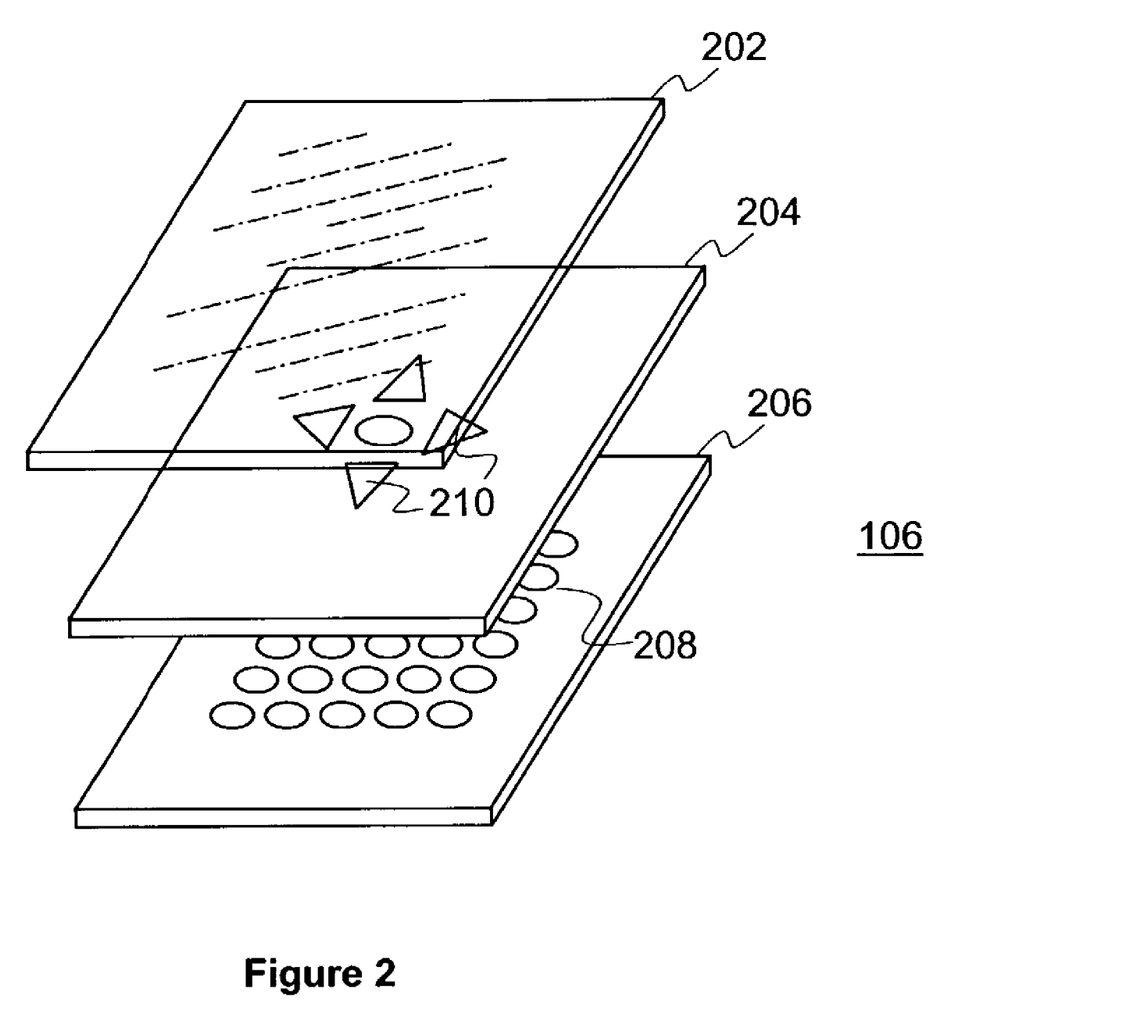
FIG. 2 illustrates an exploded perspective view of the tactilely enhanced visual image display of FIG. 1, in accordance with one embodiment.

FIG. 2 illustrates an exploded perspective view of the tactilely enhanced visual imaging display 106 of FIG. 1, in accordance with one embodiment. As illustrated, for the embodiment, tactilely enhanced visual imaging display 106 comprises a transparent touch sensitive layer 202, a flexible visual display layer 204 and a tactile display layer 206, successively disposed adjacent to other as shown.

Flexible visual display layer 204 is employed to render visual images, such as the "arrow" and "select" array image 210 illustrated in FIG. 2. Flexible visual display layer 204 comprises a matrix of pixels, and flexible visual display layer 204 has the characteristics of being particularly thin and flexible.

Tactile display layer 206 disposed on the back side of flexible visual display layer 204 is employed to tactilely enhanced visual images rendered on flexible visual display layer 204. Tactilely display layer 206 is also employed to facilitate user interaction, i.e. touching, with the tactilely enhanced visual images.

Tactile display layer 206 comprises a number of pistons 208 and a sensor circuit (not shown). For the embodiment, pistons 208 are disposed in an effective core area of display 106. Pistons 208 may be selectively activated/raised to push against different corresponding portions of flexible visual display layer 204. Since visual display layer 204 is flexible, the pushing creates a raised or elevated condition for the visual images rendered on the area being pushed. The sensor circuit detects and reports any touching by a user of any of the tactilely enhanced visual images.

Transparent touch sensitive layer 202 is employed to provide conventional touch sensing for non-tactilely enhanced visual images. For the embodiment, transparent touch sensitive layer 202 has a hollowed effective area, surrounding the effective core area of tactile display layer 206.

Tactile enhanced visual imaging display 106 is the subject matter of U.S. Pat. No. 7,138,985, entitled "Tactilely Enhanced Visual Image Display" and issued on Nov. 21, 2006, that patent having the same inventorship and being contemporaneously filed with the present application. Its specification is hereby fully incorporated by reference.

In alternate embodiments, the present invention may be practiced with an embodiment of tactilely enhanced visual image display 106 without the "top" transparent touch sensitive layer 202.

Dynamically Formed Non-Persistent Input Keys

Figure 3A:
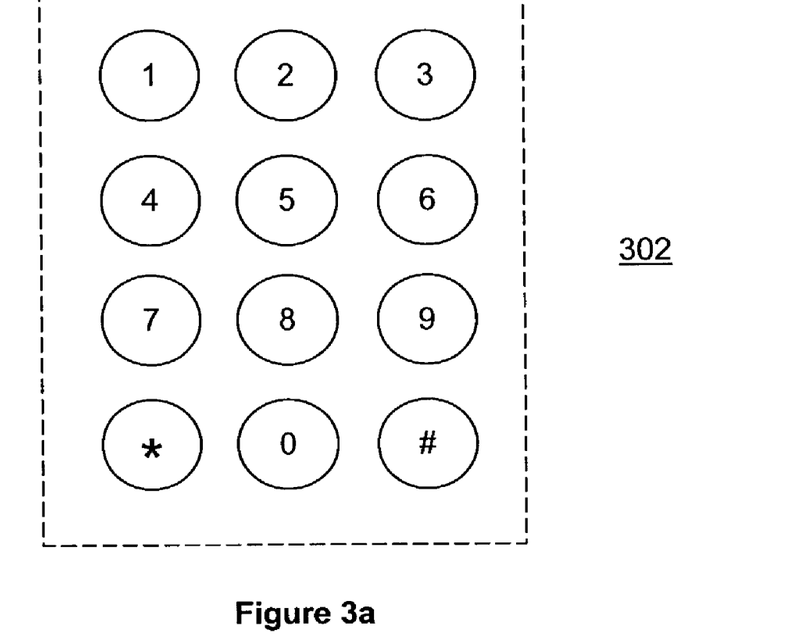
FIGS. 3a-3g illustrate various example non-persistent input keys that may be dynamically formed using the tactilely enhanced visual images of the present invention, in accordance with a number of embodiments.

FIGS. 3a-3g illustrate various example non-persistent input keys that may be dynamically formed using the tactilely enhanced visual images of the present invention, in accordance with a number of embodiments. As illustrated in FIG. 3a, a number of non-persistent tactilely enhanced numeric input keys may be dynamically formed on display 106 by first rendering the visual images of these keys on the flexible visual display layer 204, and then tactilely enhancing these visual images by selectively activating/raising the corresponding pistons 208 of tactile display layer 206.

Figure 3B:
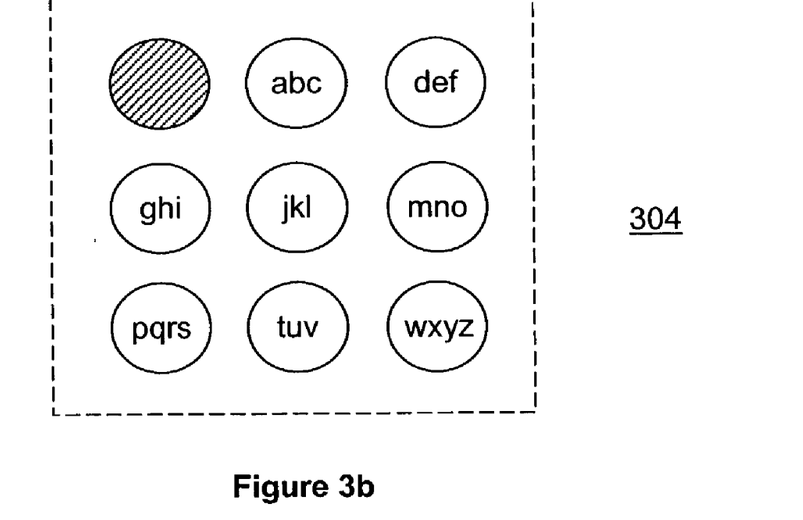
Figure 3C:
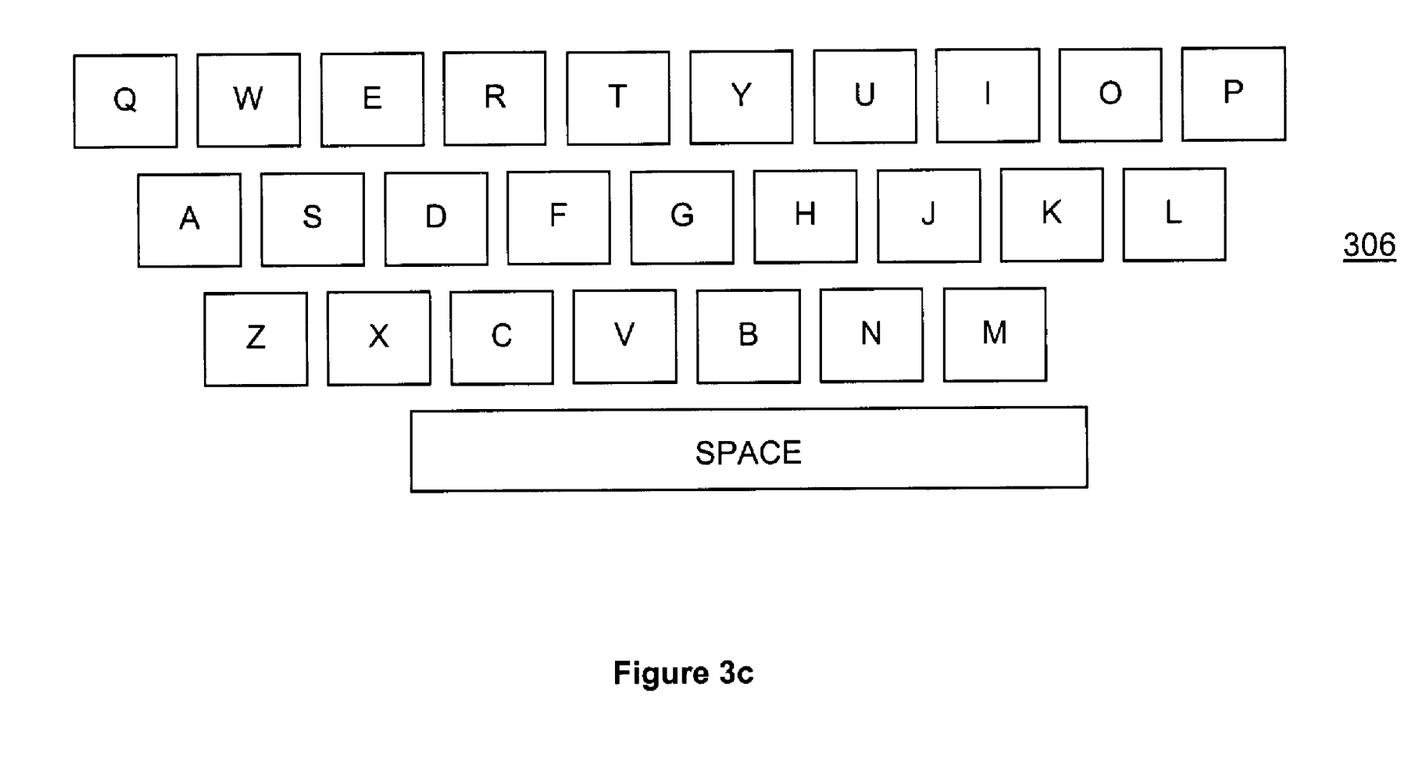

Similarly, as illustrated in FIG. 3b and 3c, a number of non-persistent tactilely enhanced alphabet input keys may be dynamically formed on display 106 in a like manner. Depending on the application (e.g. wireless mobile phone or email), the non-persistent tactilely enhanced alphabet input keys may be formed in a 9-key arrangement or the QWERT arrangement.

Figure 3D:
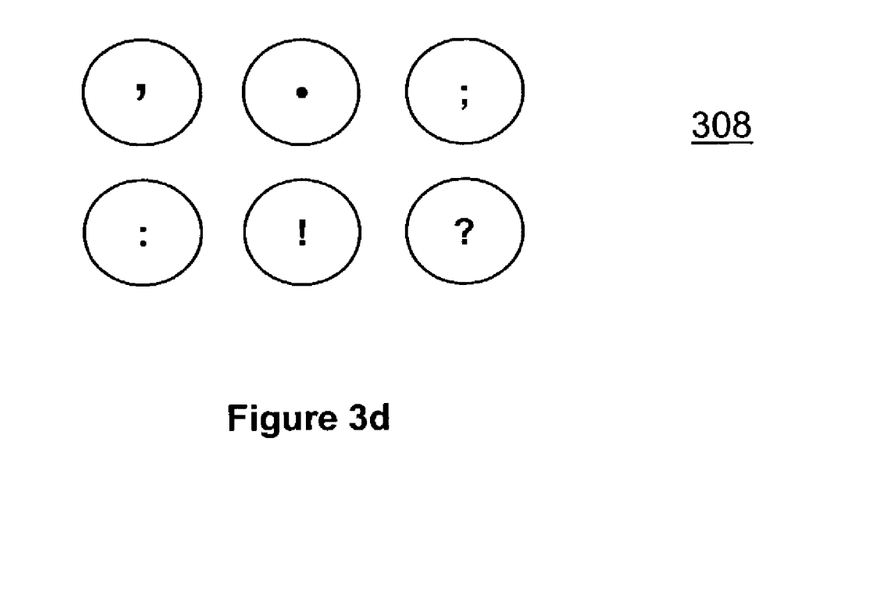
Figure 3E:
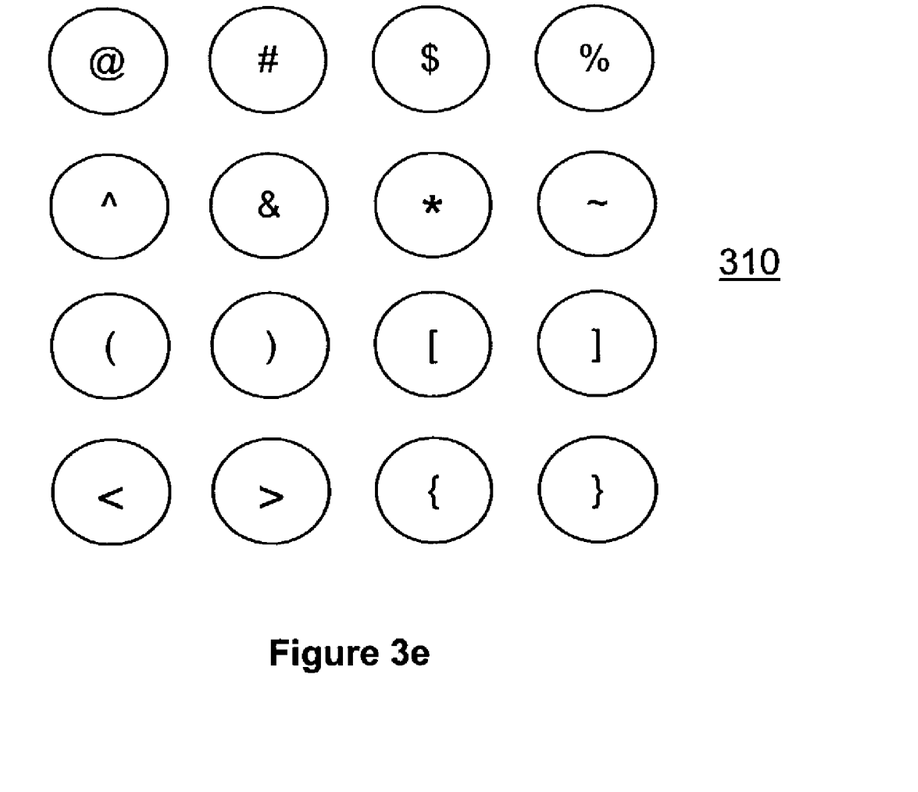

Similarly, as illustrated in FIG. 3d and 3e, a number of non-persistent tactilely enhanced punctuation and special character input keys may be dynamically formed on display 106 in a like manner.

Figure 3F:
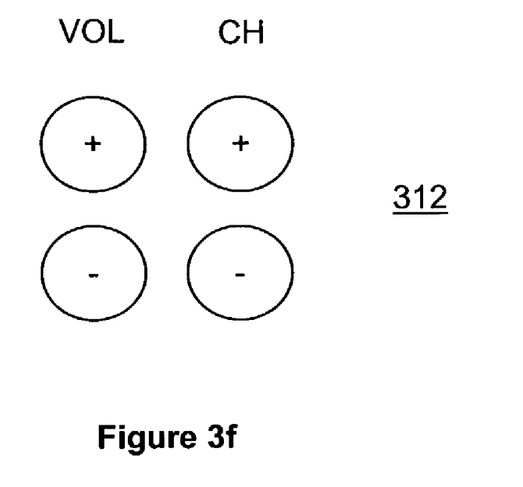
Figure 3G:
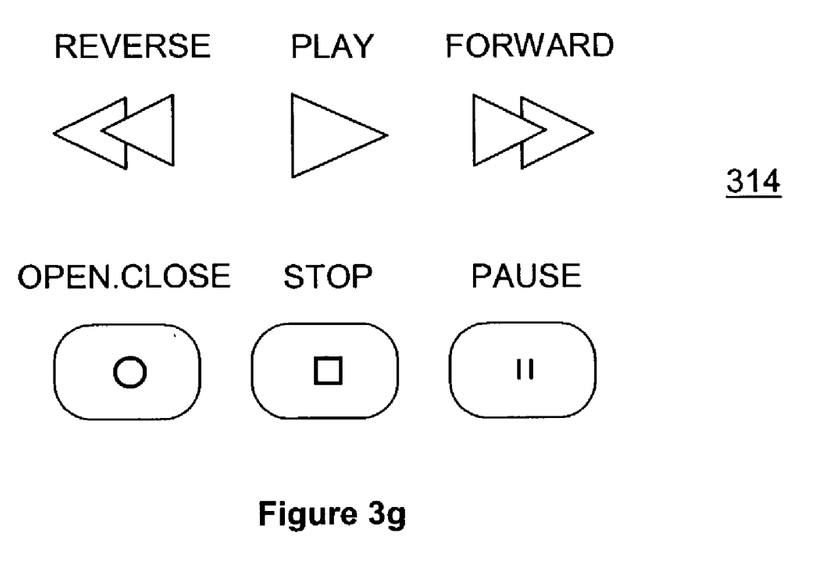

Similarly, as illustrated in FIG. 3f and 3g, a number of non-persistent tactilely enhanced function/control keys may be dynamically formed on display 106 in a like manner. These function/control keys may be function/control of various media devices, including but are not limited to TV, VCR player, CD/DVD player, MP3 player, set-top box, and so forth.

In various embodiments, in addition to or in lieu of the above illustrated dynamically formed non-persistent tactilely enhanced keys/buttons, these keys/buttons may also include "go up", "go down", "go left", "go right", "page up", "page down" and/or device selection keys/buttons. Device selection keys/buttons may e.g. be also employed to facilitate selection of a media device, such as a TV, a VCR player, a CD/DVD player, and so forth.

In various embodiments, various tactilely enhanced input key group selection keys may also be provided. That is, various non-persistent tactilely enhanced keys may be dynamically formed to facilitate a user in causing the tactilely enhanced numeric, alphabetic or "special" keys/buttons to be dynamically formed for use by the user.

Tactilely Enhanced Menu/List Items

Figure 3H:
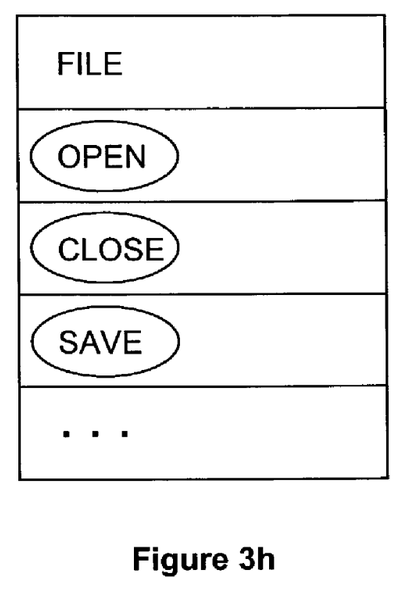
FIGS. 3h-3i illustrate various example menu and list items that may be dynamically formed using the tactilely enhanced visual images of the present invention, in accordance with a number of embodiments.
Figure 3I:
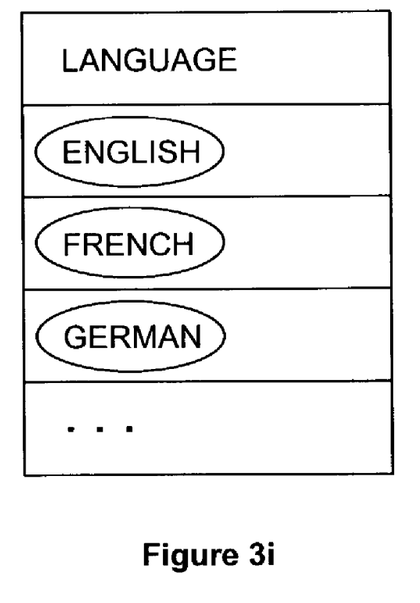

FIGS. 3h-3i illustrate various example menu and list items that may be formed using the tactilely enhanced visual images of the present invention, in accordance with a number of embodiments. As illustrated in FIG. 3h, in like manner, as earlier described for tactilely enhanced input keys, user selectable menu items may likewise be tactilely enhanced to improve user experience in interacting with these user interface elements.

In like manner, as illustrated in FIG. 3i, user selectable list items may also be tactilely enhanced to improve user experience in interacting with these user interface elements.

Tactilely Enhanced Visual Image Specification and Graphics Function Call

Figure 4:
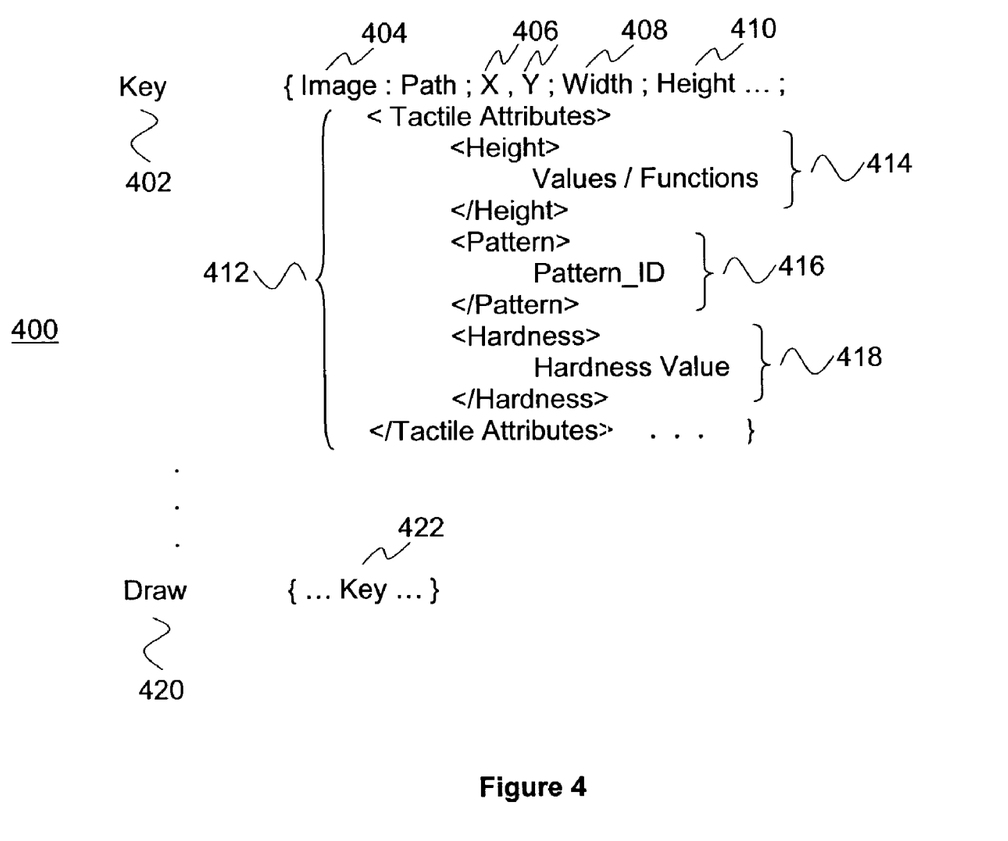
FIG. 4 illustrates a tactilely enhanced visual image specification of the present invention and a companion graphics function call to render the tactilely enhanced visual image specified, in accordance with one embodiment.

FIG. 4 illustrates a tactilely enhanced visual image specification of the present invention and a companion graphics function call to render the tactilely enhanced visual image specified, in accordance with one embodiment. As illustrated, for the embodiment, an application, such as application 120 of FIG. 1, in source form, may specify a tactilely enhanced visual image to provide a non-persistent tactilely enhanced input key in a manner similar to the manner icon/image is conventional specified in a source program.

Example key specification 402 may include a reference 404 to the visual image to be rendered. Reference 404 may e.g. be in the form of a path name of a file system or a URL, identifying a local or remote location from which the visual image to be rendered may be obtained.

Example key specification 402 may further include the location the visual image is to be rendered, e.g. in the form of the x, y coordinates 406 of an invisible "control box" containing the visual image to be rendered, and the extents in the x and y directions 408-410, also referred to as the width and height of the visual image.

Example key specification 402 may further include various tactile attribute specifications 412 specifying the tactile enhancements for the visual image. These tactile attributes may e.g. include the height, the medium height or the maximum height of the pistons to be activated or raised 414, a pattern of the pistons to be employed 416, and the hardness to be simulated 418.

In various embodiments, the specified height is resolved to be the maximum height of the centroid piston of the group of pistons to be activated.

In various embodiments, different patterns may be employed to tactilely enhance a visual image. For examples, the group of pistons to be employed may form a square pattern, a rectangular pattern, a parallelogram pattern, a rhombus pattern, a circular pattern, a triangle pattern, a pentagon/hexagon pattern, a star pattern, and so forth.

In various embodiments, the hardness specification provides the specification for the resistance to be provided by the associated servo mechanism of the pistons, against a user pushing or touching the activated/raised pistons.

Accordingly, for the embodiment, a developer of application 120 may cause the desired tactilely enhanced visual image to be rendered calling 420 (see also 122 of FIG. 1) a graphics function/service (132 of FIG. 1) of a graphic function/service library (130 of FIG. 1) of the execution environment, similar to other conventional graphics calls.

Graphics Function

Figure 5:
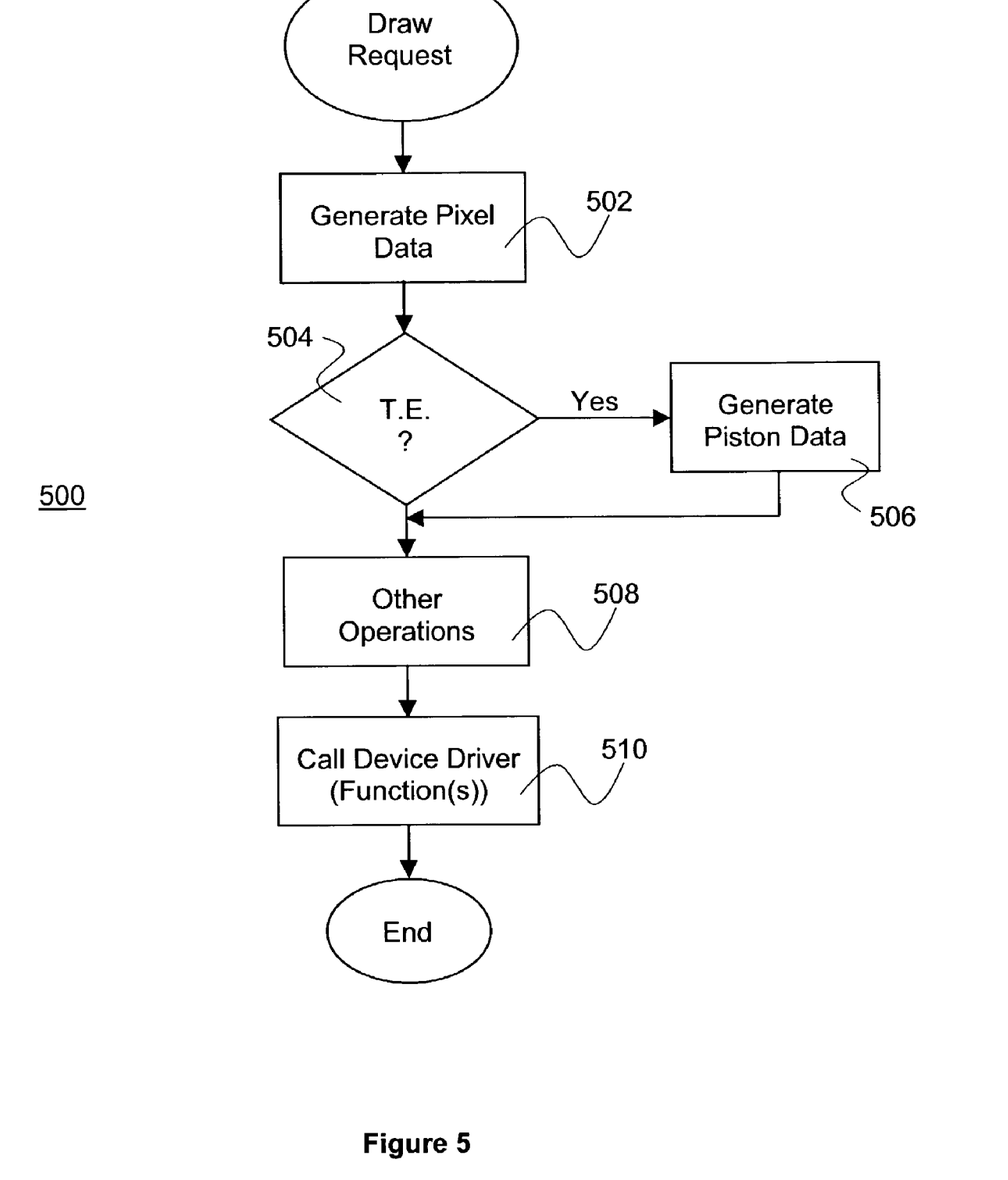
FIG. 5 illustrates the operational flow of the relevant aspects of a graphics function of the present invention, in accordance with one embodiment.

FIG. 5 illustrates the operational flow of the relevant aspects a graphics function of the present invention, in accordance with one embodiment. As illustrated, upon receipt of a draw request or a graphics operation request of the like, based on the parameters and information supplied, the graphics function first generates the pixel data, block 502. Then, the graphics function determines if the visual image to be rendered is to be tactilely enhanced or not (based on the parameters or information provided with the call), block 504.

If the visual image to be rendered is also to be tactilely enhanced, the graphics function also generates the piston data, block 506.

Upon generating the pixel and the piston data (if applicable), the graphics function performs other application dependent processing as in the prior art, block 506.

Thereafter, the graphics function invokes the appropriate functions of a device driver or appropriate device drivers, to drive the flexible visual display layer 204 to render the visual image, using the pixel data generated, and to drive the tactile display layer 206 to selectively activate/raise the applicable pistons, to tactilely enhance the corresponding visual image rendered, using the piston data generated, block 510.

In one embodiment, different device drivers 140, one each, are provided to control the corresponding layers 202-206 of display 106. In another embodiment, different functions of a single device driver 140, are provided to control the corresponding layers 202-206 of display 106. In yet another embodiment, a combination hybrid approach is employed.

Date Structure and Format

Figure 6:
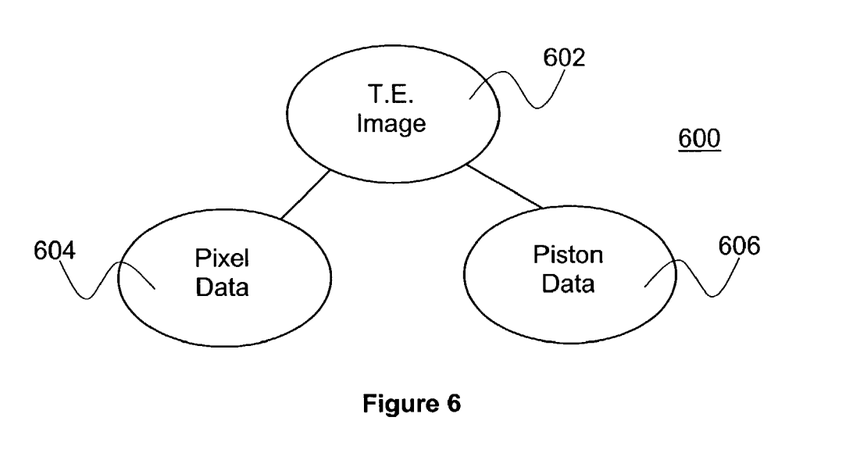
FIGS. 6-7 illustrate a data structure and a data format suitable for use to store the pixel and piston data of a tactilely enhanced visual image of the present invention, in accordance with one embodiment.
Figure 7:
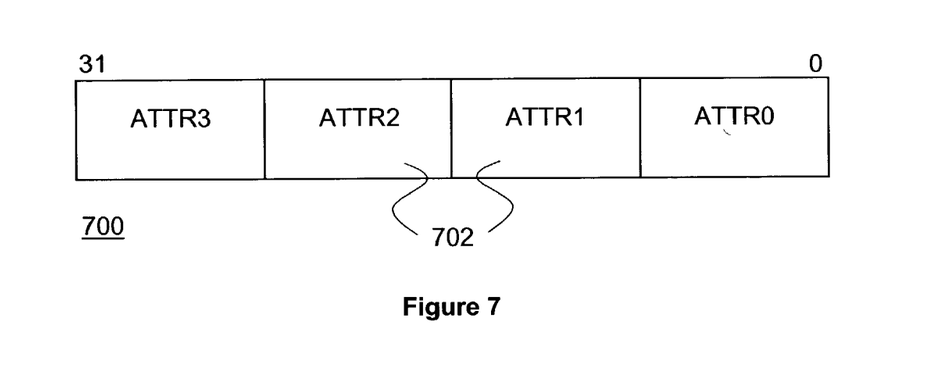

FIGS. 6-7 illustrate a data structure and a data format suitable for use to store the pixel and piston data of a tactilely enhanced visual image of the present invention, in accordance with one embodiment. As illustrated in FIG. 6, the pixel and piston data of a tactilely enhanced visual image are organized as an object hierarchy 600, with the identity and global attributes of the tactilely enhanced visual image being stored in a root object 602 of the object hierarchy 600.

The pixel data are stored in a children pixel data object 604 of root object 602, and the piston data are stored in a children piston data object 606 of root object 602.

As illustrated in FIG. 7, the piston data of each piston is stored in a 32-bit word 700, with the value of four tactile attributes occupying four corresponding bytes 702.

In alternate embodiments, the present invention may be practiced employing other data organizations and/or other data formats.

Example Applications

Figure 8A:
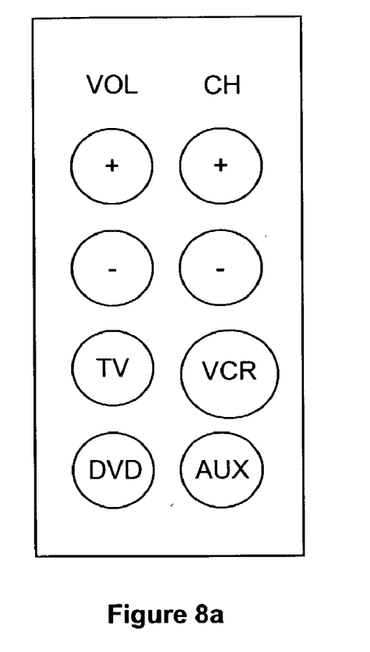
FIGS. 8a-8f illustrate various example devices that may be incorporated with the teachings of the present invention.

FIGS. 8a-8f illustrate various example devices that may be incorporated with the teachings of the present invention, in accordance with various embodiments. As illustrated in FIG. 8a, the present invention may be applied and practiced on a "universal" remote control for controlling a wide range of media devices, including but are not limited to TV, VCR, CD/DVD players, and so forth. The control/function keys of these devices are dynamically formed employing tactilely enhanced visual images as earlier described.

Figure 8B:
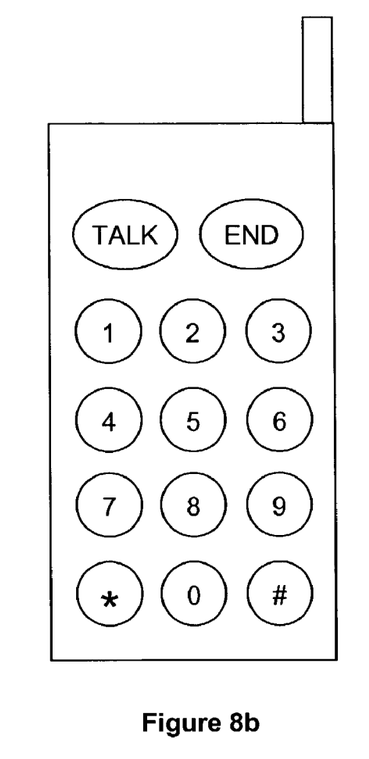
Figure 8C:
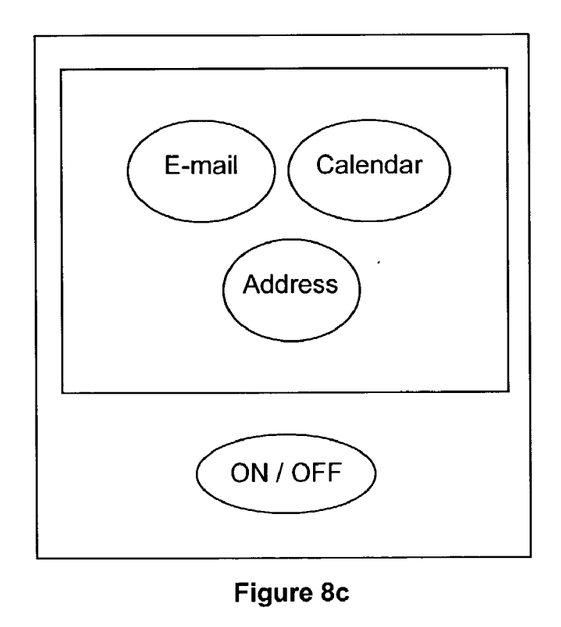
Figure 8D:
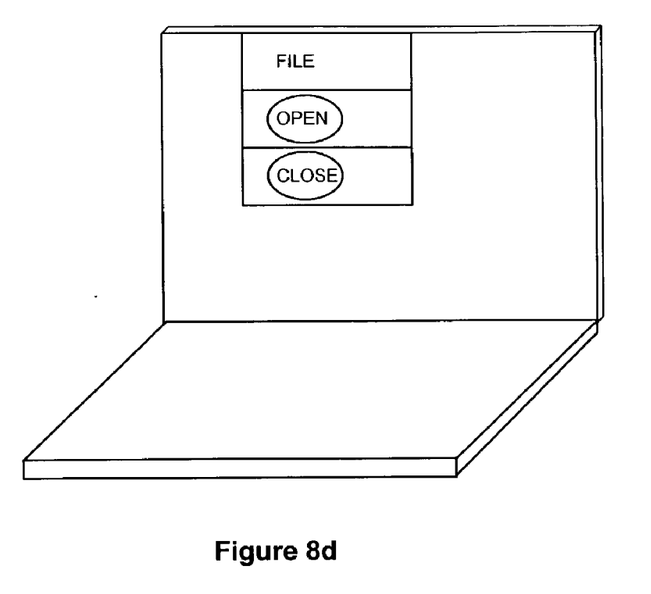
Figure 8E:
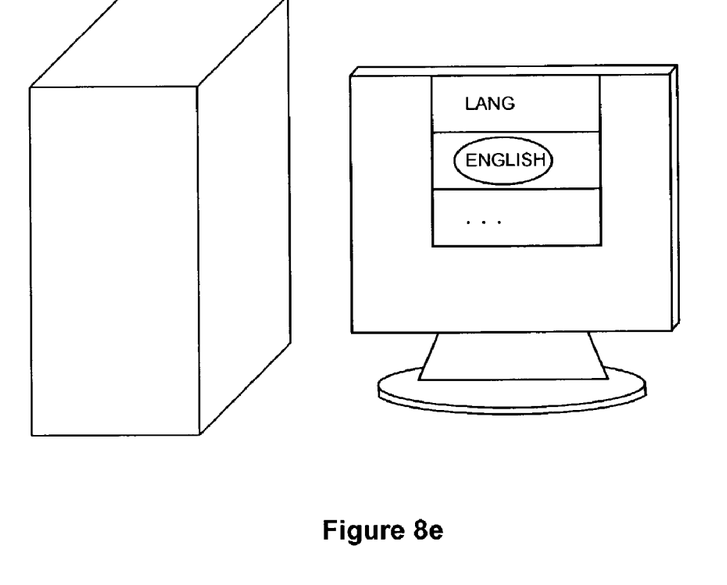
Figure 8F:
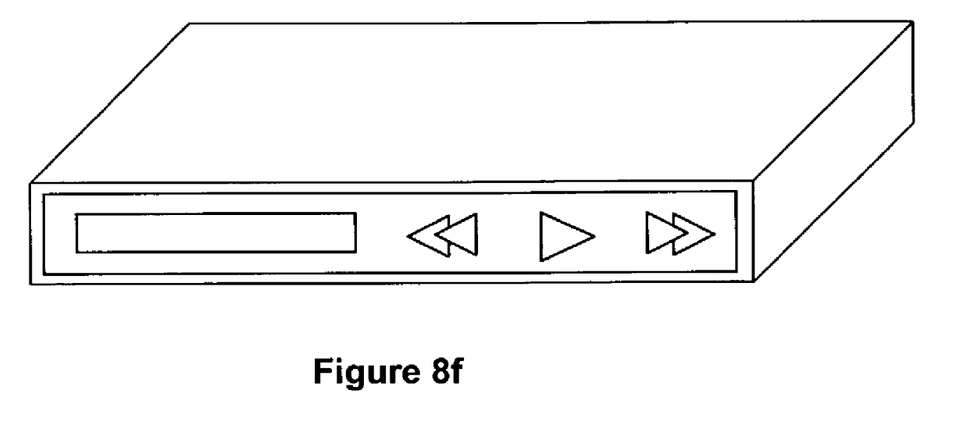

As illustrated in FIG. 8f, the present invention may be applied and practiced on these media devices themselves, i.e. TV, VCR, CD/DVD players and so forth.

Similarly, as illustrated in FIG. 8b, the present invention may also be applied and practiced on a rich function wireless mobile phone, or as illustrated in FIG. 8c, a PDA.

Likewise, the present invention may also be applied and practiced on a palm-sized computing device (not shown), a tablet computing device (not shown), a laptop computing device, FIG. 8d, and a desktop computing device, FIG. 8e.

Conclusion and Epilogue

Thus, it can be seen from the above descriptions, a novel method for forming an interactive apparatus, employing tactilely enhanced visual images, has been described.

While the present invention has been described in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. An apparatus comprising:
   a touch sensitive visual display including a flexible visual display layer, a touch sensitive layer, and a tactile display layer, the flexible visual display layer configured to render visual images using a matrix of pixels, the touch sensitive layer, having a hollowed effective area, configured to provide touch sensing for non-tactilely enhanced visual images, and the tactile display layer, having an effective core area substantially aligned with the ineffective area of the touch sensitive layer, configured to tactilely enhance at least a portion of the rendered visual images using pistons and to detect contact with the rendered tactilely enhanced visual images;
   a first display driver to control selective activation/deactivation of the pixels of the flexible visual display layer to facilitate rendering of visual images on the flexible visual display layer; and
   a second display driver to control the pistons of the tactile display layer to facilitate complementary selective tactile indenting of different portions of a part of the flexible visual display layer that is complimentary to the effective core area of the tactile display layer, said selective tactile indenting to tactilely enhance at least a part of at least one of the rendered visual images.

2. The apparatus of claim 1, wherein the tactilely enhanced visual images comprise dynamically formed non-persistent (DFNP) input keys.

3. The apparatus of claim 2, wherein the DFNP input keys comprise a DFNP input key group selection key to facilitate selection of one of a plurality of DFNP input key groups, each having one or more DFNP input keys.

4. The apparatus of claim 3, wherein the DFNP input key groups comprise at least two of a DFNP alphabet input key group, a DFNP numeric key group, a DFNP punctuation input key group, a DFNP special character input key group, and a DFNP function key group.

5. The apparatus of claim 2, wherein the DFNP input keys comprise a selected one of DFNP alphabet input keys and DFNP numeric input keys.

6. The apparatus of claim 2, wherein the DFNP input keys comprise a selected one of DFNP punctuation input keys and DFNP special character keys.

7. The apparatus of claim 2, wherein the DFNP input keys comprise a DFNP function key.

8. The apparatus of claim 7, wherein the DFNP function key is a selected one of a DFNP go up key, a DFNP go down key, a DFNP go left key and a DFNP go right key.

9. The apparatus of claim 7, wherein the DFNP function key is a selected one of a DFNP page up key and a DFNP page down key.

10. The apparatus of claim 7, wherein the DFNP function key is a selected one of a DFNP start key, a DFNP stop key, a DFNP forward key and a DFNP reverse key.

11. The apparatus of claim 7, wherein the DFNP function key is a selected one of a DFNP select key, a DFNP channel up/down key, a DFNP volume up/down key, and a DFNP volume mute key.

12. The apparatus of claim 7, wherein the DFNP function key is a device selection key to facilitate selection of one of a plurality of devices controlled by the apparatus.

13. The apparatus of claim 7, wherein the DFNP function key is a selected one of a DFNP call key and a DFNP end call key.

14. The apparatus of claim 1, wherein the tactilely enhanced visual images comprise selected ones of user selectable menu items and user selectable list items.

15. The apparatus of claim 1, further comprising a collection of graphics functions, communicatively coupled to the first and second device drivers, to facilitate an application in rendering the tactilely enhanced visual images, the graphics functions further adapted to determine if one or more of the rendered visual images are to be tactilely enhanced.

16. The apparatus of claim 15, wherein at least one of the graphics functions is equipped to generate a plurality of pixel and piston data of the tactilely enhanced visual image to be rendered, based at least in part on an image specification specifying the tactilely enhanced visual image to be rendered.

17. The apparatus of claim 16, wherein the image specification comprises
   an identification of the visual image to be rendered; and
   one or more tactile attribute specifications specifying one or more tactile attributes for tactile enhancements of the rendered visual image.

18. The apparatus of claim 17, wherein the tactile attributes comprise at least a selected one of a tactile pin height attribute, a tactile pin pattern attribute, and a tactile pin hardness attribute.

19. The apparatus of claim 17, wherein the tactile attributes comprise at least two of a tactile pin height attribute, a tactile pin pattern attribute, and a tactile pin hardness attribute.

20. The apparatus of claim 17, wherein the tactile attributes comprise at least a tactile pin height attribute, a tactile pin pattern attribute, and a tactile pin hardness attribute.

21. The apparatus of claim 1, wherein the apparatus further comprises a third device driver to detect a user selection of a tactilely enhanced visual image.

22. The apparatus of claim 21, wherein the second and third device drivers are functions of the same device driver.

23. The apparatus of claim 1, wherein the apparatus is a selected one of a multi-device remote control, a personal digital assistant, and a wireless mobile phone.

24. The apparatus of claim 1, wherein the apparatus is a selected one of a palm sized computer, a tablet computer, a laptop computer, a desktop computer, a set-top box, and a media player.

25. A method comprising:
   receiving a request for a graphics operation to render a visual image;
   determining if the visual image is to be tactilely enhanced; and
   if the visual image is to be tactilely enhanced, generating in response, a plurality of pixel and piston data for said tactilely enhanced visual image to be rendered, the pixel data for use by a flexible visual display layer of a display and piston data for use by a tactile display layer of the display, the tactile display layer having a effective core area corresponding to an ineffective area of a touch sensitive layer of the display.

26. The method of claim 25, wherein said generating comprises generating a plurality of pixel and piston data for said tactilely enhanced visual image to be rendered, based at least in part on an image specification specifying said tactilely enhanced visual image to be rendered.

27. The method of claim 26, wherein the image specification comprises
an identification of the visual image to be rendered; and
one or more tactile attribute specifications specifying one or more tactile attributes for tactile enhancements of the rendered visual image.

28. The method of claim 27, wherein the tactile attributes comprise at least a selected one of a tactile pin height attribute, a tactile pin pattern attribute, and a tactile pin hardness attribute.

29. The method of claim 27, wherein the tactile attributes comprise at least two of a tactile pin height attribute, a tactile pin pattern attribute, and a tactile pin hardness attribute.

30. The method of claim 27, wherein the tactile attributes comprise a tactile pin height attribute, a tactile pin pattern attribute, and a tactile pin hardness attribute.

31. The method of claim 25, wherein the method further comprises:
rendering the visual image on the flexible visual display layer using the generated pixel data; and
if the visual image rendered is to be tactilely enhanced, tactilely enhancing at least a portion of the rendered visual image on the effective core area of the tactile display layer using the generated piston data.

32. An apparatus comprising:
display means for displaying tactilely enhanced visual images and for detecting contact with the displayed tactilely enhanced visual images;
first control means for controlling selective activation/deactivation of pixels to facilitate rendering of visual images, the first control means controlling selective activation/deactivation of pixels to be made on a flexible visual display layer of the display; and
second control means for controlling complementary selective tactile enhancements of selected ones of the rendered visual images, the second control means controlling selective tactile enhancements to be made on an effective core area of a tactile display layer of the display, the effective core area corresponding to an ineffective area of a touch sensitive layer of the display.

33. An article of manufacture comprising:
a storage medium having a plurality of programming instructions stored therein, the plurality of programming instructions adapted to program an apparatus to
receive a request for a graphics operation to render a tactilely enhanced visual image;
determine if the visual image is to be tactilely enhanced; and
if the visual image is to be tactilely enhanced, generate in response, a plurality of pixel and piston data for said tactilely enhanced visual image to be rendered, the pixel data for use by a flexible visual display layer of a display and the piston data for use by a tactile display layer of the display, the tactile display layer having a effective core area corresponding to an ineffective area of a touch sensitive layer of the display.

34. The article of claim 33, wherein the programming instructions are further adapted to program an apparatus to generate a plurality of pixel and piston data, and the generating comprises generating a plurality of pixel and piston data for said tactilely enhanced visual image to be rendered, based at least in part on an image specification specifying said tactilely enhanced visual image to be rendered.

35. The article of claim 34, wherein the image specification comprises:
an identification of the visual image to be rendered; and
one or more tactile attribute specifications specifying one or more tactile attributes for tactile enhancements of the rendered visual image.

36. The article of claim 35, wherein the tactile attributes comprise at least a selected one of a tactile pin height attribute, a tactile pin pattern attribute, and a tactile pin hardness attribute.

37. The article of claim 35, wherein the tactile attributes comprise at least two of a tactile pin height attribute, a tactile pin pattern attribute, and a tactile pin hardness attribute.

38. The article of claim 35, wherein the tactile attributes comprise a tactile pin height attribute, a tactile pin pattern attribute, and a tactile pin hardness attribute.

39. The article of claim 33, wherein the programming instructions are further adapted to program an apparatus to
render the visual image on the flexible visual display layer using the generated pixel data; and
if the visual image rendered is to be tactilely enhanced, tactilely enhance at least a portion of the rendered visual image on the effective core area of the tactile display layer using the generated piston data.

* * * * *